Feb. 22, 1966     D. A. POTEET     3,236,541
TRAILER HITCH

Filed July 29, 1963     2 Sheets-Sheet 1

INVENTOR.
DALLAS A. POTEET
BY
*Dunlap Laney & Hubbard*
ATTORNEYS

United States Patent Office 3,236,541
Patented Feb. 22, 1966

1

3,236,541
TRAILER HITCH
Dallas A. Poteet, P.O. Box 828, Duncan, Okla.
Filed July 29, 1963, Ser. No. 298,095
2 Claims. (Cl. 280—490)

This invention relates generally to improvements in trailer hitches, and more particularly, but not by way of limitation, to an improved support for the tow bar of a trailer hitch.

As it is well known in the art, the usual trailer hitch comprises a tow bar rigidly secured to the towing vehicle by being welded or rigidly clamped to the frame of the towing vehicle, and a frame or harness rigidly secured to the trailer or other vehicle to be towed. A ball-type connector is rigidly secured on the rear end of the tow bar and is received in a mating socket carried by the harness of the vehicle to be towed, in order that the pulling force provided by the towing vehicle will be transmitted to the towed vehicle, yet the towing vehicle may be turned with respect to the towed vehicle. Such trailer hitches are efficient, except for the difficulty involved in connecting and disconnecting the towed vehicle to and from the towing vehicle and in maintaining the towed vehicle level. The springs of a trailer being towed with its front end either high or low rather quickly become weak and the trailer tends to whip.

In order for the socket to be placed over the ball of a trailer hitch, either the socket must be raised, or the ball must be lowered. When the towed vehicle is in the form of a light-weight trailer, the front end of the trailer may be raised manually for connecting and disconnecting the hitch. However, when the towed vehicle is of substantial size and weight, some mechanical means must be provided to raise and lower the front end of the towed vehicle. This mechanical means normally takes the form of a screw jack which requires a ground engaging member, such as a small wheel, underneath the harness or front end of the towed vehicle. The ground engaging member is normally removed when the trailer hitch is connected and is frequently lost or misplaced when needed. Also, such jacks are expensive and frequently difficult to operate.

The present invention contemplates a novel trailer hitch construction wherein the tow bar is connected to the towing vehicle in such a manner as to be vertically adjustable, yet retained in a substantially horizontal position and in alignment with the longitudinal axis of the towing vehicle, whereby the ball-type connector can be easily raised into the socket carried by the towed vehicle to connect the hitch, and the ball-type connector may be easily lowered out of the ball socket to disconnect the hitch. In a preferred embodiment, a threaded aperture is formed vertically through a medial portion of the tow bar and receives a vertically extending threaded shaft journaled in a fixed vertical position on the towing vehicle for raising and lowering the tow bar in the manner of a screw jack action. The tow bar is extended into and through a housing containing the threaded shaft, in such a manner that the tow bar is guided by the sides and ends of the housing and is constantly retained in alignment with the longitudinal axis of the towing vehicle. When the tow bar is in the desired operating position with the towed vehicle level, it is further made secure to the towing vehicle by a set screw to assure that the tow bar will not move during a towing operation.

An object of this invention is to minimize the manual effort required in connecting and disconnecting a trailer hitch.

Another object of this invention is to provide a trailer hitch construction which may be easily connected and disconnected, even when the towing vehicle and the towed vehicle are supported on uneven terrain, and which will retain the towed vehicle level.

A further object of this invention is to eliminate the necessity of using jacks and accessory equipment on heavy, towed vehicles.

Another object of this invention is to increase the service life of the springs of trailers.

Another object of this invention is to provide a trailer hitch construction which may be used on all types of towing and towed vehicles, and wherein all parts of the trailer hitch are permanently secured to the towing and towed vehicle, in place, to eliminate the necessity of keeping track of miscellaneous parts.

A still further object of this invention is to provide a trailer hitch which is simple in construction, may be economically manufactured, and which will have a long service life.

Other objects and advantages of the invention will be evident from the following detailed description, when read in conjunction with the accompanying drawings which illustrate the invention.

Figure 1:
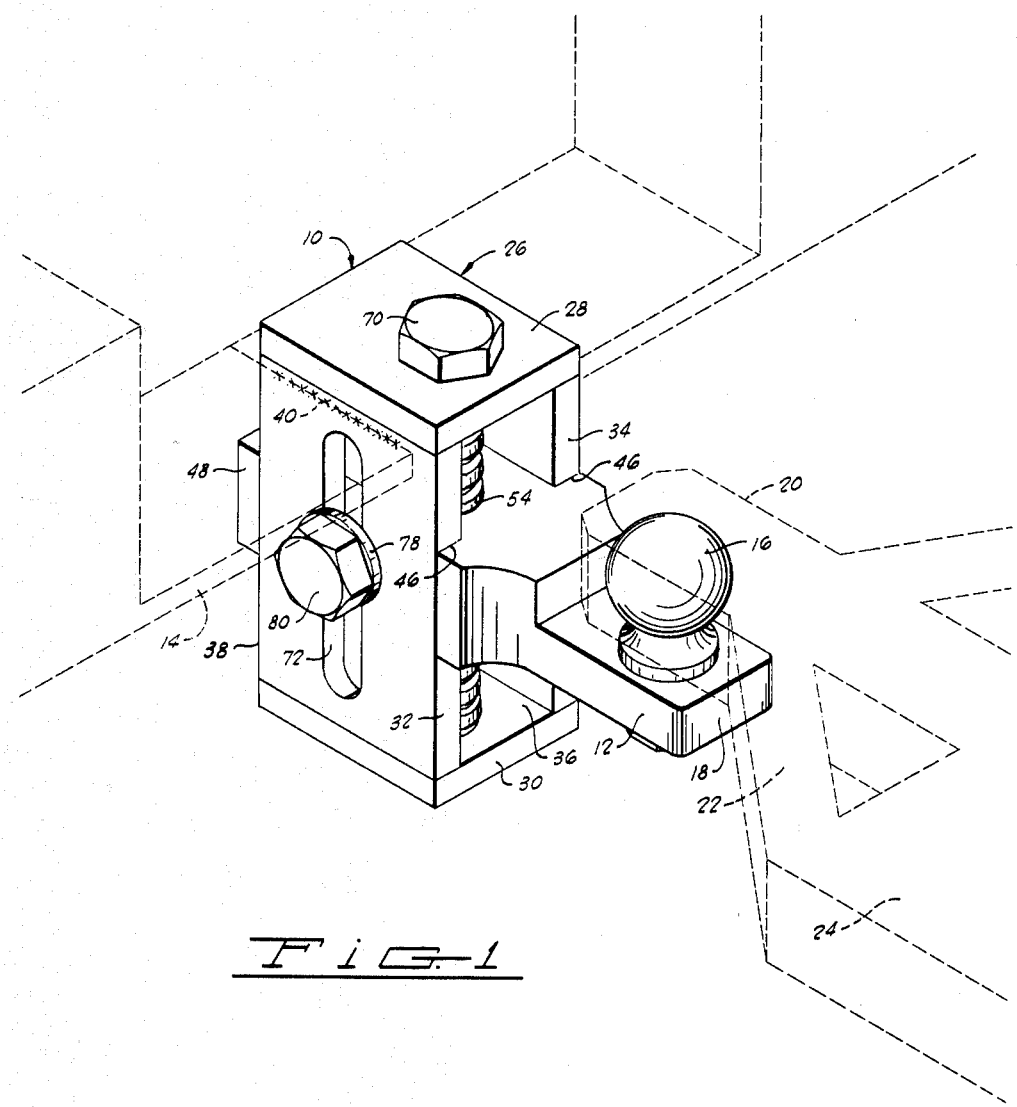
FIGURE 1 is a perspective view of a tow bar and supporting structure constructed in accordance with this invention, with an illustration of a portion of a towing vehicle and a towed vehicle in dashed lines to illustrate the use of the hitch.

Referring to the drawings in detail and particularly FIG. 1, reference character 10 generally designates a trailer hitch constructed in accordance with the invention which includes a tow bar 12 secured to a towing vehicle 14 in alignment with the longitudinal axis (not shown) of the towing vehicle. The usual ball-type connector 16 is secured on the rear end 18 of the tow bar 12 and is received in the usual socket 20 supported by a harness or framework 22 extending from a towed vehicle 24, such as a trailer.

The tow bar 12 extends forwardly through a housing 26 having top and bottom walls 28 and 30 and side walls 32 and 34. Both the rearward end 36 and the forward end 38 of the housing 26 are open in order that the tow bar 12 can extend therethrough. The housing 26 is rigidly secured to the towing vehicle 14 in a vertical position, such as by welding 40 along the side walls 32 and 34 of the housing. It may also be stated that the housing 26 is secured with the side walls 32 and 34 thereof on opposite sides of and parallel with the longitudinal axis of the towing vehicle 14.

Figure 2:
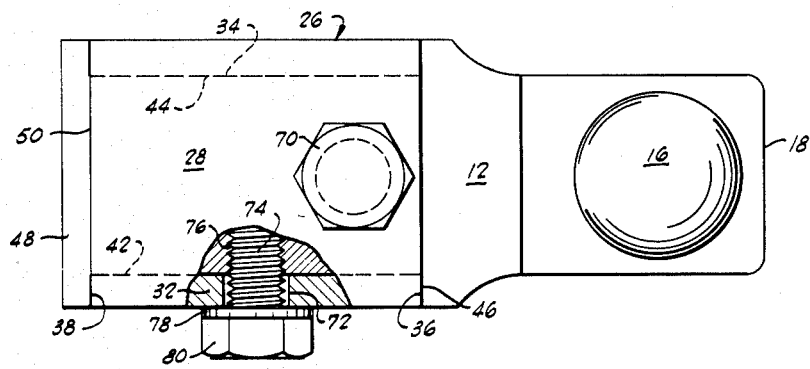
FIGURE 2 is a plan view of the tow bar and supporting structure, with a portion of the structure broken away and shown in section to illustrate details of construction.

As best shown in FIG. 2, that portion of the tow bar 12 extending through the housing 26 is of a width such that the opposite edges 42 and 44 thereof are in sliding contact with the inner faces of the housing side walls 32 and 34, respectively. Also, forwardly facing shoulders 46 are formed on the opposite sides of the tow bar 12 in sliding contact with the rear edges 36 of the housing side walls 32 and 34, and a plate or bar 48 is secured on the forward end 50 of the tow bar 12 in a position to extend beyond the opposite sides of the tow bar and make sliding contact with the forward edges 38 of the housing side walls 32 and 34. It will thus be apparent that the tow bar 12 will be retained in a horizontal position and aligned with the longitudinal axis of the towing vehicle 14 in all vertical positions of the tow bar.

Figure 3:
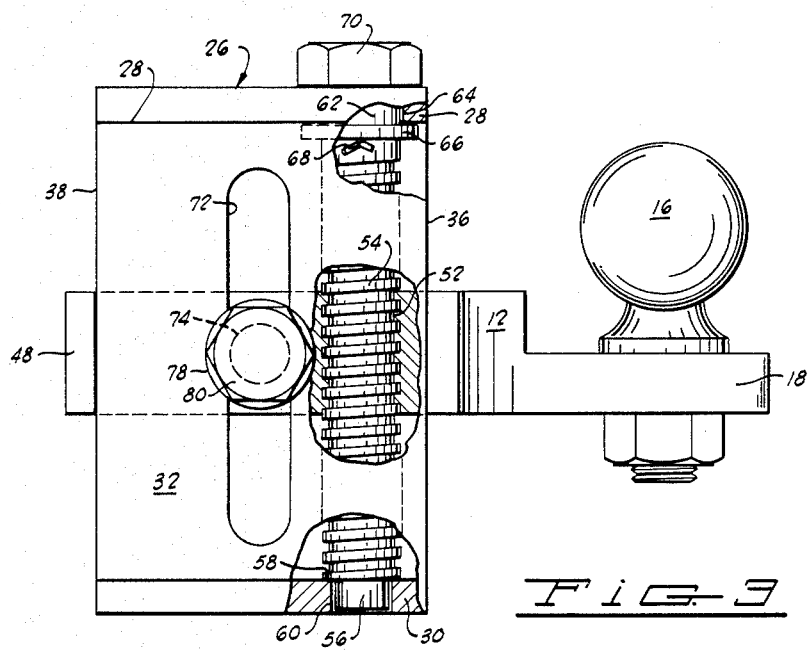
FIGURE 3 is a side view of the tow bar and supporting structure, again with portions of the structure broken away and shown in section to illustrate details of construction.

As shown in FIG. 3, a threaded aperture 52 is formed vertically through the medial portion of the tow bar 12 within the housing 26 to receive and mate with a vertically extending threaded shaft 54. The lower end 56 of the shaft 54 is reduced in diameter to provide a downwardly facing annular shoulder 58 resting on the housing bottom wall 30 and is sized to rotatably fit in a mating aperture 60 in the bottom wall 30 of the housing 26. The upper end portion 62 of the shaft 54 extends rotatably through a mating aperture 64 formed in the top wall 28 of the housing in alignment with the aperture 60 in the bottom wall 30. The upper portion 62 of the shaft 54 may be either threaded or unthreaded, but is preferably unthreaded to provide a more efficient bearing of the shaft in the aperture 64. Also, it is preferred to provide a washer 66 around the upper end portion 62 of the shaft 54 immediately below the lower face of the housing top wall 28 to prevent the shaft 54 from being raised during operation. The washer 66 may be secured in the desired vertical position by a suitable cotter pin 68 extending through a mating aperture (not shown) in the shaft 54. A head 70 is provided on the upper end portion 62 of the shaft 54 in contact with the upper face of the housing top wall 28 for use in turning the shaft 54. The head 70 may take any desired form to be received by any suitable wrench and may be, for example, in the form of a hex-nut of the same size as the lug bolts on the wheels (not shown) of the towing vehicle 14.

A vertical slot 72 is formed in the housing side wall 32 to loosely receive a set screw 74. The set screw 74 is threaded into a mating threaded aperture 76 formed in the side 42 of the tow bar 12 and is used to secure the tow bar 12 in a fixed vertical position, as will be described. It is desirable to use a washer 78 around the set screw 74 between the head 80 of the set screw and the outer face of the housing side wall 32.

*Operation*

When it is desired to connect the towing vehicle 14 to the towed vehicle 24, the set screw 74 is loosened and the tow bar 12 is lowered by turning the shaft 54 in the proper direction until the ball 16 is below the level of the socket 20. The vehicle 14 is then maneuvered until the ball 16 is in vertical alignment with the socket 20; whereupon the threaded shaft 54 is turned in the opposite direction to raise the ball 16 into the socket 20. When the ball 16 is firmly positioned in the socket 20 and the trailer 24 is level, the set screw 74 is tightened to rigidly secure the tow bar 12 in this vertical position to the housing 26, and, hence, to the towing vehicle 14. The hitch 10 is then fully connected and the towed vehicle 24 will trail the towing vehicle 14 in a level condition.

When it is desired to disconnect the towed vehicle 24 from the towing vehicle 14, the set screw 74 is loosened to free the tow bar 12 for vertical movement. The threaded shaft 54 is then turned in the proper direction to lower the tow bar 12 and remove the ball 16 from the socket 20. The towing vehicle 14 may then be driven away from the towed vehicle 24.

From the foregoing, it will be apparent that the present invention will minimize the effort required in connecting and disconnecting a towing vehicle to a vehicle to be towed. The tow bar of the present hitch may be easily raised and lowered for ease in connecting the ball-type connector to a mating trailer hitch socket without having to manipulate the vehicle to be towed in any manner. It will further be apparent that the tow bar will be rigidly connected to the towing vehicle in a horizontal position in alignment with the longitudinal axis of the towing vehicle in all vertical positions of the tow bar, such that the hitch may be used on various sizes of vehicles to be towed with the tow bar 12 in various vertical positions and such that the towed vehicle will be retained level during operation. Finally, it will be apparent that the present hitch construction is simple, may be economically manufactured and will have a long service life.

Changes may be made in the combination and arrangement of parts or elements as heretofore set forth in the specification and shown in the drawings without departing from the spirit and scope of the invention as defined in the following claims.

I claim:

1. A trailer hitch comprising:
   a housing including
      a pair of spaced, vertically extending side walls, each having front and rear vertical edges,
      a vertical slot extending through one side wall, and
      upper and lower ends joining said side walls, each of said ends having an aperture extending vertically therethrough between said front and rear edges;
   a tow bar having
      front and rear ends,
      a pair of parallel sides in sliding engagement with side walls,
      a pair of forwardly facing shoulders in sliding engagement with said rear vertical edges,
      a pair of rearwardly facing shoulders in sliding engagement with said front edges, and
      a threaded aperture extending vertically through the medial portion thereof between said shoulders and between said parallel sides, and in vertical alignment with the apertures in said ends;
   a set screw extending through said vertical slot and threaded into one side of the tow bar for securing the tow bar in an adjusted position;
   a threaded shaft extending through said aperture and mating with the threads in said threaded aperture;
   means journaling said threaded shaft in a fixed vertical position in said housing;
   means for turning the threaded shaft in opposite directions for raising and lowering the tow bar in sliding relationship with the sidewalls and front and rear edges of said housing whereby the movement of said tow bar relative to said housing is limited to a vertical direction; and,
   a ball connector secured on the rear end of the tow bar.

2. In a trailer hitch for connecting a towing vehicle to the vehicle to be towed, comprising:
   a housing adapted to be connected to the towing vehicle, said housing including
      a pair of spaced, vertically extending side walls, each having a front vertical edge and a rear vertical edge, and
      upper and lower ends joining said side walls, said ends each having an aperture extending vertically therethrough;
   a tow bar having
      front and rear ends,
      a pair of parallel sides in sliding engagement with said side walls, a pair of forwardly facing shoulders in sliding engagement with said rear vertical edges, a pair of rearwardly facing shoulders in sliding engagement with said front vertical edges, and a threaded aperture extending vertically through the medial portion of said tow bar in vertical alignment with the apertures in said ends and between said parallel sides;

a threaded shaft extending through said apertures and mating with the threads in said threaded aperture;

means journaling said threaded shaft in a fixed vertical position in said housing;

means for turning the threaded shaft in opposite directions for raising and lowering the tow bar in sliding relationship with the side walls and with the front and rear vertical edges of said housing whereby the movement of the tow bar relative to said housing is limited to a vertical direction; and means on the rear end of the tow bar adapted to be connected with the towed vehicle.

References Cited by the Examiner

UNITED STATES PATENTS

| | | | |
|---|---|---|---|
| 2,560,625 | 7/1951 | Boggs et al. | 280—490 X |
| 3,018,117 | 1/1962 | Bechard | 280—490 |
| 3,035,856 | 5/1962 | Mleczko et al. | 280—490 |

FOREIGN PATENTS

| | | |
|---|---|---|
| 493,688 | 6/1950 | Belgium. |
| 972,718 | 8/1950 | France. |

BENJAMIN HERSH, *Primary Examiner.*

LEO FRIAGLIA, *Examiner.*